Patented Sept. 16, 1952

2,610,939

UNITED STATES PATENT OFFICE 2,610,939

METHOD OF LAMINATING GLASSINE PAPER

Jacob I. Fisher and George C. Borden, Jr., Easton, Pa., assignors to Riegel Paper Corporation, New York, N. Y., a corporation of New Jersey No Drawing. Application December 26, 1946, Serial No. 718,629

8 Claims. (Cl. 154—138)

This invention relates to improvements in the lamination of paper and includes an improved laminated paper, an improved method for the production thereof, and an improved laminating composition therefor.

The invention relates more particularly to the lamination of glassine paper and provides an improved paper made by laminating two sheets of glassine as well as improved papers made by laminating glassine to sulfite paper or to foils or other films.

The improved laminating paper of the present invention is characterized by an unusual combination of desirable properties including exceptional moisture-vapor-proofness, high bond strength, stable and good ageing properties, freedom from odor, necessary in food packaging, good light color, and exceptionally good folding qualities, giving good packaging machine operation.

It has been proposed to laminate glassine paper with wax, including amorphous wax, as well as wax with resins such as rosin and rosin esters, but the use of these resins tends to lower the moisture-vapor-proof property and to make the laminants less pliable, such that when the two sheets are separated they tend to do so with a ripping sound and are said to be "rippy."

We have found that improved laminated paper can be produced by the use of a special laminating composition made up mainly of amorphous petroleum wax and having combined therewith a stabilized rosin, such as polymerized rosin or a hydrogenated rosin, a liquid polybutene plasticizer and "butyl" rubber in regulated proportions and by applying this composition as a hot melt to the paper to produce the laminated paper. Polybutene is a polymer of isobutylene (Ind. & Engr. Chem., vol. 32, No. 3, March, 1940) and "butyl" rubber is an isobutylene-conjugated diolefin copolymer containing a small amount of unsaturation (Ind. & Engr. Chem., vol 32, No. 10, October 1940). Both are well known articles of commerce.

The wax used as the principal constituent of the new laminating composition is an amorphous or microcrystalline petroleum wax.

The resin which is compounded with this wax is a stabilized rosin, such as heat treated rosin or a hydrogenated rosin in sufficient amount so that it makes up about 12 to 20% of the laminating composition.

The plasticizer used is a polybutene or mixture of polymerized butylenes or isobutylenes of a degree of polymerization such that the products are liquid in character, varying from an oil to a heavy viscous type of material. Such polybutene plasticizer is used in amount of about 2 to 5% of the composition, depending somewhat upon the other ingredients.

There is also included in the laminating composition "butyl" rubber, this material being advantageous as a film-former, being miscible with amorphous waxes in all proportions and compatible with the other ingredients in the laminating melt. From 2 to 8% of "butyl" rubber is advantageously used and around 2 to 5% is usually sufficient.

This use of these four materials in the laminating composition gives an unusual combination of desirable properties in the laminated paper.

A composition which has been found very satisfactory for laminating two sheets of glassine and also for laminating glassine to sulfite paper or to foils and other films is a composition made up of about 83% of amorphous wax, about 12% of polymerized rosin ("polypale resin," Hercules) about 3% of a heavy viscous liquid polybutene (polybutene No. 64, Standard Oil Co. of New York) and about 2% of "butyl" rubber.

In using this laminating composition it may be melted and applied on a regular commercial laminating machine in the usual manner, that is, by coating one sheet on one side with the hot molten laminating composition, using usually between 5 and 10 pounds per ream of paper, then applying the second sheet to the top of this coating, and pressing the two sheets together.

A somewhat modified composition can be made using about 76% of the amorphous wax, about 19% of the polymerized rosin, about 2.5% of the heavy viscous liquid polybutene plasticizer and about 2.5% of "butyl" rubber.

The lamination of glassine paper, and of glassine paper to other paper or foil, with the use of such composite laminating compositions gives a remarkable combination of desirable properties. Decomposition of the resin in the hot melt bath is minimized or avoided by the use of a stabilized rosin such as polymerized rosin or hydrogenated rosin, as compared with the use of straight rosin or rosin esters, making possible more uniform operating conditions. The use of such a stabilized rosin gives a resulting paper with improved bond strength while the plasticizer aids in imparting softness and good folding properties and the "butyl" rubber aids in giving internal strength to the laminant as well as improved adhesive properties.

The combined use of the four ingredients which are compatible and miscible with each other in the melt, results in giving an improved laminated paper which is particularly advantageous. The improved laminated paper is characterized by special moisture-vapor-proofness. It has high bond strength. It is stable and has good ageing properties. It is characterized by freedom from odor, which is necessary in food packaging, and has a good, light color. The paper also has exceptionally good folding qualities, giving good packaging machine operation.

The advantages of the new laminated paper will be illustrated by the following comparison between glassine paper made by laminating two sheets of glassine with the four-ingredient formula of the present invention as compared with laminated glassine made by laminating two sheets of glassine, in one case with commercial amorphous wax and in another case with a laminating composition made by admixing 80% of amorphous wax and 20% resin ester.

When the laminated glassine sheets so made were tested for moisture-vapor-proofness they gave the following results for moisture-vapor-permeability (MVP) expressed in grams per 100 sq. in. for 24 hours:

The glassine sheets laminated with commercial amorphous wax gave an MVP value of .52. The sheet laminated with 80% amorphous wax and 20% resin ester gave an MVP value of .86. The sheet laminated with the four-ingredient formula of the present invention gave an MVP value of .30.

When these three sheets were tested for bond strength they gave the following figures, expressed in pounds per one inch width strip:

The glassine paper laminated with amorphous wax showed a bond strength of .130. The glassine paper laminated with the wax and resin acid mixture showed a bond strength of .223. The glassine paper laminated with the new four-ingredient composition of the present invention showed a bond strength of .434.

It will thus be seen that the present invention provides an improved laminated glassine paper in which glassine is laminated to glassine and which is particularly advantageous for use for the wrapping of food products, etc. where moisture-vapor-proofness is of paramount importance and which has other desirable and advantageous properties.

It will further be seen that the improved laminated products can be made by laminating glassine to other paper such as sulfite paper or to other films or foils with the resulting production of laminated sheets having desirable and advantageous properties.

We claim:

1. A laminating composition particularly adapted for use as a hot melt in the laminating of glassine paper to glassine paper and to other papers and foils made up for the most part of amorphous petroleum wax and having combined therewith about 12 to 20% of a stabilized rosin selected from the group which consists of polymerized rosin and hydrogenated rosin, about 2 to 5% of liquid polybutene plasticizer, and about 2 to 8% of an isobutylene-conjugated diolefin copolymer containing a small amount of chemical unsaturation.

2. A laminating composition particularly adapted for use as a hot melt in the laminating of glassine paper to other sheet material made up of the following materials in approximately the following proportions: amorphous petroleum wax, about 76 to 83%, polymerized rosin, about 12 to 19%, liquid polybutene plasticizer, about 2.5 to 3% and an isobutylene-conjugated diolefin copolymer containing a small amount of chemical unsaturation about 2 to 2.5%.

3. The method of laminating glassine paper to other sheet material which consists in applying as a laminating material a hot melt made up with a major portion of amorphous petroleum wax and having combined therewith about 12 to 20% of a stabilized rosin selected from the group which consists of polymerized rosin and hydrogenated rosin, about 2 to 5% of a liquid polybutene plasticizer, and about 2 to 8% of an isobutylene-conjugated diolefin copolymer containing a small amount of chemical unsaturation.

4. The method of laminating glassine paper to other sheet material which consists in applying as a laminating material a hot melt made up of the following materials in approximately the following proportions: amorphous petroleum wax about 76 to 83%, polymerized rosin about 12 to 19%, liquid polybutene plasticizer about 2.5 to 3% an isobutylene-conjugated diolefin copolymer containing a small amount of chemical unsaturation about 2 to 2.5%.

5. Laminated sheet material having at least one sheet of glassine paper, the layers of said sheet material being bound together by a laminating composition made up with a major portion of amorphous petroleum wax and having combined therewith about 12 to 20% of a stabilized rosin selected from the group which consists of polymerized rosin and hydrogenated rosin, about 2 to 5% of a liquid polybutene plasticizer, and about 2 to 8% of an isobutylene-conjugated diolefin copolymer containing a small amount of chemical unsaturation.

6. Laminated sheet material having at least one sheet of glassine paper, the layers of said sheet material being bound together by a laminating composition made up of the following materials in approximately the following proportions: amorphous petroleum wax about 76 to 83%, polymerized rosin about 12 to 19%, liquid polybutene plasticizer about 2.5 to 3% and an isobutylene-conjugated diolefin copolymer containing a small amount of chemical unsaturation about 2 to 2.5%.

7. Laminated glassine paper comprising sheets of glassine paper bonded together by a laminating composition made up with a major portion of amorphous petroleum wax and having combined therewith about 12 to 20% of a stabilized rosin selected from the group which consists of polymerized rosin and hydrogenated rosin, about 2 to 5% of a liquid polybutene plasticizer, and about 2 to 8% of an isobutylene-conjugated diolefin copolymer containing a small amount of chemical unsaturation.

8. Laminated glassine paper comprising sheets of glassine paper bonded together by a laminating composition made up of the following materials in approximately the following proportions: amorphous petroleum wax, about 76 to 83%, polymerized rosin about 12 to 19%, liquid polybutene plasticizer about 2.5 to 3% and an isobutylene-conjugated diolefin copolymer containing a small amount of chemical unsaturation about 2 to 2.5%.

JACOB I. FISHER.
GEORGE C. BORDEN, Jr.

REFERENCES CITED

The following references are of record in the file of this patent:

UNITED STATES PATENTS

| Number | Name | Date |
|---|---|---|
| Re. 22,438 | Corkery et al. | Feb. 22, 1944 |
| 2,031,036 | Dreymann | Feb. 18, 1936 |
| 2,098,223 | Barnhart | Nov. 9, 1937 |
| 2,115,448 | Pradt | Apr. 26, 1938 |
| 2,142,039 | Abrams et al. | Dec. 27, 1938 |
| 2,476,430 | Robbins | July 19, 1949 |

OTHER REFERENCES

"Polybutenes," by R. M. Thomas et al., published in Industrial and Engr. Chem., March 1940, pages 299–304 (vol. 32).